(12) United States Patent
Chou et al.

(10) Patent No.: US 8,970,995 B2
(45) Date of Patent: Mar. 3, 2015

(54) MAGNETORESISTANCE EFFECT ELEMENT HAVING LAYER CONTAINING ZN AT THE INTERFACE BETWEEN MAGNETIC LAYER AND NON-MAGNETIC INTERMEDIATE LAYER

(75) Inventors: Tsutomu Chou, Tokyo (JP); Shinji Hara, Tokyo (JP); Yoshihiro Tsuchiya, Tokyo (JP); Hironobu Matsuzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 1345 days.

(21) Appl. No.: 12/382,140

(22) Filed: Mar. 10, 2009

(65) Prior Publication Data

US 2010/0232073 A1  Sep. 16, 2010

(51) Int. Cl.
*G11B 5/127* (2006.01)
*B82Y 25/00* (2011.01)
*B82Y 10/00* (2011.01)
*G11B 5/39* (2006.01)

(52) U.S. Cl.
CPC .............. *B82Y 25/00* (2013.01); *B82Y 10/00* (2013.01); *G11B 5/3906* (2013.01); *G11B 2005/3996* (2013.01)
USPC ........................................ 360/324

(58) Field of Classification Search
None
See application file for complete search history.

(56) References Cited

U.S. PATENT DOCUMENTS

| 5,656,381 | A * | 8/1997 | Maeda et al. .................. 428/611 |
| 6,724,583 | B2 | 4/2004 | Seigler et al. |
| 2006/0132990 | A1 * | 6/2006 | Morise et al. ............. 360/324.12 |
| 2007/0297104 | A1 * | 12/2007 | Mizuno et al. ........... 360/324.12 |
| 2008/0112096 | A1 * | 5/2008 | Mizuno et al. ........... 360/324.12 |

FOREIGN PATENT DOCUMENTS

| JP | 2002298314 A | * | 10/2002 |
| JP | A-2003-8102 | | 1/2003 |
| JP | A-2003-298143 | | 10/2003 |
| JP | A-2008-91842 | | 4/2008 |
| JP | 2008124173 A | * | 5/2008 |
| JP | A-2008-124173 | | 5/2008 |

* cited by examiner

*Primary Examiner* — Holly Rickman
*Assistant Examiner* — Lisa Chau
(74) *Attorney, Agent, or Firm* — Posz Law Group, PLC (57) ABSTRACT

A thin film magnetic head includes a magnetoresistive effect (MR) laminated body that has the following structure: first and second magnetic layers in which the magnetization direction of at least one of the magnetic layers changes according to an external magnetic field; the first magnetic layer is provided at a lower side of a laminated direction; the second magnetic layer is provided at an upper side of the laminated direction; a non-magnetic intermediate layer made of ZnO sandwiched between the first and the second magnetic layers; a first intermediate interface layer is provided at the interface between the first magnetic layer and the non-magnetic intermediate layer; and a second intermediate interface layer is provided at the interface between the non-magnetic intermediate layer and the second magnetic layer. At least the first intermediate interface layer contains Ag and Zn, or Au and Zn.

14 Claims, 8 Drawing Sheets

MAGNETORESISTANCE EFFECT ELEMENT HAVING LAYER CONTAINING ZN AT THE INTERFACE BETWEEN MAGNETIC LAYER AND NON-MAGNETIC INTERMEDIATE LAYER

BACKGROUND OF THE INVENTION

1. Field of the Invention

The present invention relates to a thin film magnetic head. Specifically, the present invention relates to the device structure of a thin film magnetic head having a magnetoresistance effect element (MR element) that includes a layer containing Zn at the interface between a magnetic layer and a non-magnetic intermediate layer.

2. Description of the Related Art

As the high recording density of a hard disk drive (HDD) has been developed, heads of high sensitivity and high output have been required. A spin valve head was invented as a head that satisfies the aforementioned requirements. A spin valve head is provided with a pair of ferromagnetic layers on both sides of a non-magnetic intermediate layer. An antiferromagnetic layer is disposed in contact with one ferromagnetic layer, and the magnetization direction of the ferromagnetic layer is fixed in one direction by means of exchange coupling with the antiferromagnetic layer. The magnetization direction of the other ferromagnetic layer freely rotates according to an external magnetic field. Such a ferromagnetic layer is referred to as a free layer. In a spin valve head, the change in the relative angle of spins in these two ferromagnetic layers brings about the change in the magnetoresistance.

A spin valve structure is not always required to obtain a large magnetoresistance ratio (MR ratio) for high sensitivity and high output, but the electric resistance according to the change in the relative angle of spins must be greatly changed. In order to achieve this, it is important that oxidation of a magnetic layer is prevented, and a spin polarizability of the magnetic layer is not decreased by a layer adjacent to the magnetic layer. Specifically, when a giant magnetoresistance (GMR) effect is utilized by using a semiconductor material as a non-magnetic intermediate layer sandwiched by magnetic layers, a large MR ratio is expected. However, at the same time, it is necessary that an influence of a non-magnetic intermediate layer made of oxide upon a magnetic layer is kept as small as possible.

It is well known that a non-magnetic metal layer is formed at the interface between a non-magnetic intermediate layer and a magnetic layer to reduce the magnetic characteristic degradation of the magnetic layer. For example, Japanese laid-open patent application number 2008-124173 discloses that, in a structure in which two magnetic layers sandwich a non-magnetic intermediate layer made of ZnO, an intermediate interface layer made of Zn is sandwiched at each of the interfaces between the magnetic layer and the non-magnetic intermediate layer. According to the layer structure described above, since an influence of the non-magnetic intermediate layer upon the magnetic layer is decreased, it is expected to have a large MR ratio due to the layer structure compared with a structure that a non-magnetic intermediate layer and a magnetic layer directly contact each other. However, such a large MR ratio is vastly decreased after an annealing process that is always required during manufacturing processes. This is because Zn and O atoms are diffused from a non-magnetic intermediate layer to a magnetic layer even though through an intermediate interface layer; and it is understood that Zn is further diffused from the intermediate interface layer that contacts the magnetic layer. Therefore, it is important that the heat resistance is considered for realizing reading heads of high sensitivity and high output in such a layer structure.

SUMMARY OF THE INVENTION

The present invention relates to a thin film magnetic head having an MR laminated body that includes two magnetic layers in which the magnetization direction of at least one of the magnetic layers rotates according to an external magnetic field, and a non-magnetic intermediate layer made of ZnO that is sandwiched between the two magnetic layers. The object of the present invention is to provide a thin film magnetic head having a layer structure that achieves a high MR ratio while a characteristic degradation of a magnetic layer due to a heat treatment, such as an annealing process, is as small as possible.

A thin film magnetic head according to one embodiment of the present invention includes first and second magnetic layers in which a magnetization direction of at least one of the first and second magnetic layers changes according to an external magnetic field, the first magnetic layer being provided at a lower side of a laminated direction, and the second magnetic layer being provided at an upper side of the laminated direction, a non-magnetic intermediate layer made of ZnO that is sandwiched between the first and second magnetic layers, a first intermediate interface layer provided at an interface between the first magnetic layer and the non-magnetic intermediate layer; and a second intermediate interface layer provide at an interface between the non-magnetic intermediate layer and the second magnetic layer. The first and second magnetic layers, the non-magnetic intermediate layer, and the first and second intermediate interface layers configure a magnetoresistive effect (MR) laminated body, and at least the first intermediate interface layer contains Ag and Zn, or Au and Zn.

In such a thin film magnetic head, since at least one intermediate interface layer provided at the lower side of a laminated direction is made of Ag and Zn, or Au and Zn among two intermediate interface layers provided at each of the interfaces between two magnetic layers and a non-magnetic intermediate layer sandwiched therebetween, it is difficult for atoms to move inside a crystal lattice compared with an intermediate interface layer made of Zn only according to the crystallization relationship among each of the layers. For that reason, since the diffusion of atoms, Zn and O, from the non-magnetic intermediate layer is controlled, a decrease in spin polarizability can be avoided. Similarly, the diffusion of Zn from the intermediate interface layer contacting the magnetic layer is also avoided. Ag and Au contained in the intermediate interface layer have the property of a non-solid solution with the magnetic layer. Therefore, the intermediate interface layer itself does not create an adverse effect on the magnetic layer such as decreasing the polarizability of the magnetic layer by an application of heat.

As discussed above, a thin film magnetic layer having a layer structure that achieves a high MR ratio while a characteristic degradation of a magnetic layer due to a heat treatment, such as an annealing process, is as small as possible is provided.

The aforementioned object, as well as other objects, characteristics, and advantages of the present invention will be described below in more detail with reference to attached drawings illustrating an embodiment of the present invention.

Figure 1:
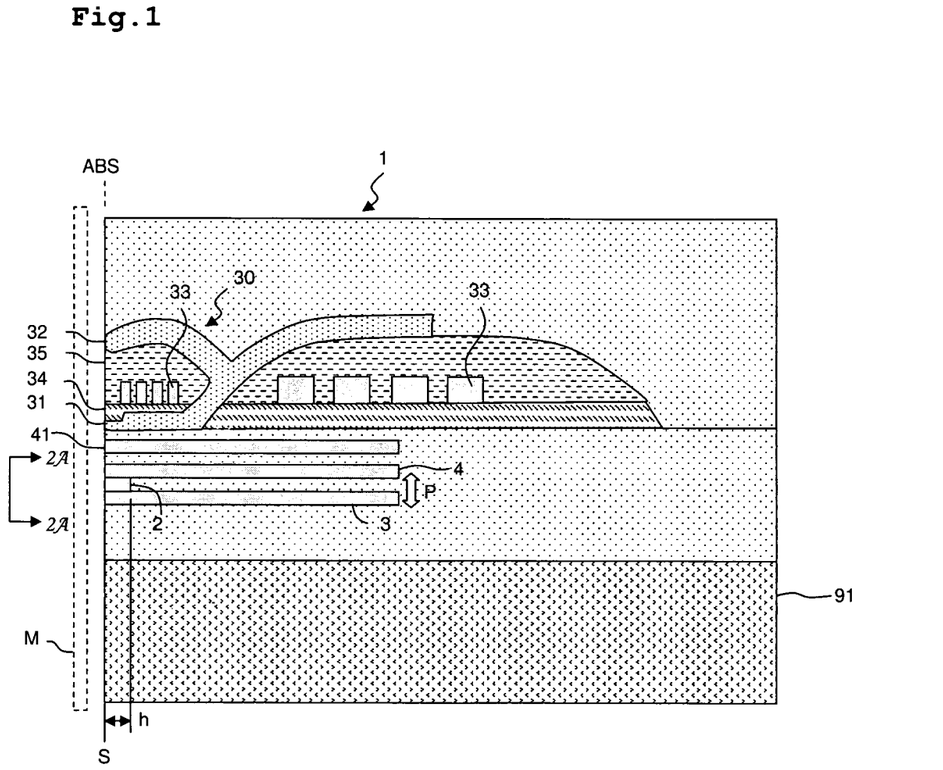
FIG. 1 is a side sectional view of the thin film magnetic head according to one embodiment of the present invention.
Figure 2A:
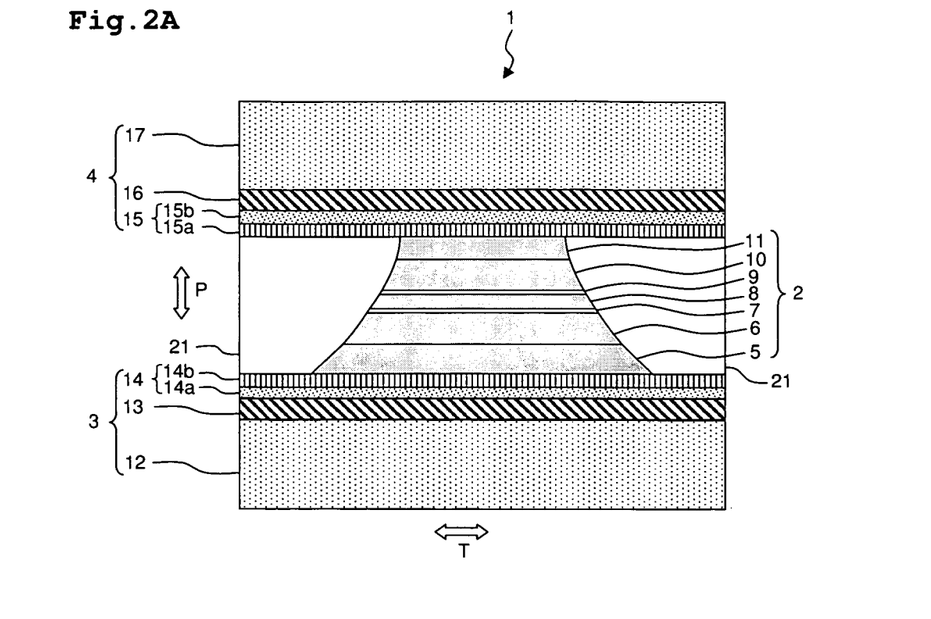
FIG. 2A is a side view of the reading part of the thin film magnetic head seen from the 2A-2A direction in FIG. 1.
Figure 2B:
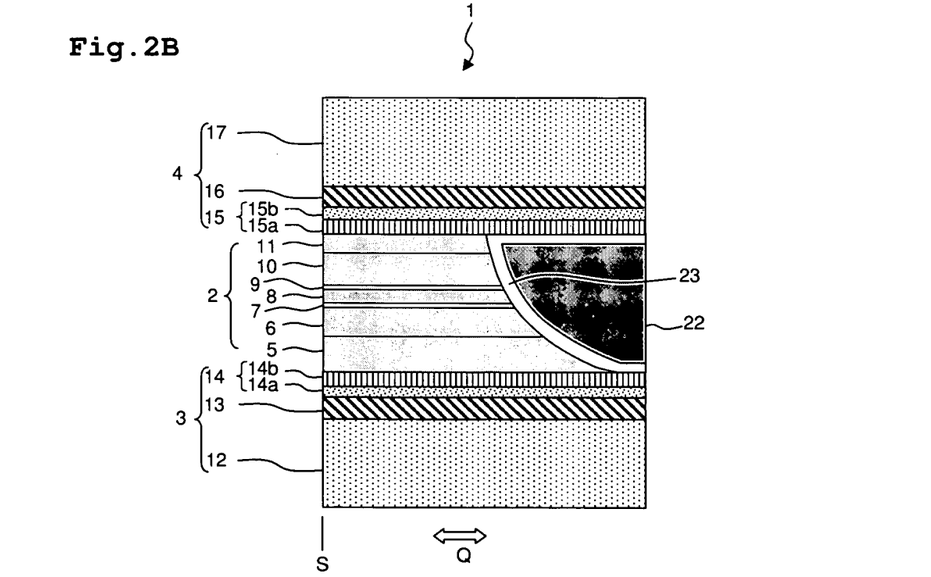
FIG. 2B is a sectional view of the reading part of the thin film magnetic head seen from the same direction as FIG. 1 is shown.

A description of the thin film magnetic head according to one embodiment of the present invention is given below with reference to the drawings. FIG. 1 is a side sectional view of the thin film magnetic head according to the present embodiment. FIG. 2A is a side view of the reading part of the thin film magnetic head seen from the 2A-2A direction, i.e., an air bearing surface (ABS) S, in FIG. 1. FIG. 2B is a sectional view of the reading part of the thin film magnetic head seen from the same direction in FIG. 1. The ABS S is the surface of a thin film magnetic head 1 on the side facing a recording medium M.

The thin film magnetic head 1 includes an MR laminated body 2 and first and second shield layers 3 and 4 provided on both sides of the MR laminated body 2 in an orthogonal direction to the film surface of the MR laminated body. Table 1 shows layer configurations of the MR laminated body and the first and second shield layers 3 and 4. The table shows the laminated layers from the first shield layer 3 to the second shield layer 4 in a bottom up direction.

TABLE 1

| | Layer Configuration | | Layer Thickness (nm) | Magnetization Direction |
|---|---|---|---|---|
| Second Shield Layer 4 | Second Main Shield Layer 17 | NiFe Layer | 1000 | |
| | Second Antiferromagnetic Layer 16 | IrMn Layer | 6 | |
| | Second Exchange Coupling Magnetic Field Application Layer 15 | CoFe Layer 15b | 1.5 | ← |
| | | NiFe Layer 15a | 10 | |
| MR Laminated Body 2 | Second Magnetic Linkage Layer 11 | Ru Layer | 0.8 | |
| | Second Magnetic Layer 10 | CoFe Layer | 3 | → |
| | Second Intermediate Interface Layer 9 | Zn Layer | 0.4 | |
| | Non-Magnetic Intermediate Layer 8 | ZnO Layer | 1.6 | |
| | First Intermediate Interface Layer 7 | Ag—Zn Layer | 0.8 | |
| | First Magnetic Layer 6 | CoFe Layer | 3 | ← |
| | First Magnetic Linkage Layer 5 | Ru Layer 5c | 0.8 | |
| | | CoFe Layer 5b | 1 | → |
| | | Ru Layer 5a | 0.8 | |
| First Shield Layer 3 | First Exchange Coupling Magnetic Field Application Layer 14 | NiFe Layer 14b | 10 | ← |
| | | CoFe Layer 14a | 1.5 | |
| | First Antiferromagnetic Layer 13 | IrMn Layer | 6 | |
| | First Main Shield Layer 12 | NiFe Layer | 1000 | |

As shown in FIG. 2A and Table 1, the MR laminated body 2 includes a first magnetic 5 layer 6 in which the magnetization direction is changed according to an external magnetic field, a non-magnetic intermediate layer 8, and a second magnetic layer 10 in which the magnetization direction is changed according to the external magnetic field. The first magnetic layer 6, the non-magnetic intermediate layer 8, and the second magnetic layer 10 are laminated in this order. A first magnetic linkage layer 5 is provided to be adjacent to the first magnetic layer 6. A second magnetic linkage layer 11 is provided to be adjacent to the second magnetic layer 10.

The first magnetic layer 6 and the second magnetic layer 10 are both made of CoFe, respectively. The non-magnetic intermediate layer 8 is made of ZnO that is a semiconductor material. The thin film head 1 functions as a current perpendicular to the plane (CPP)—GMR element.

First and second intermediate interface layers 7 and 9 are provided between the first magnetic layer 6 and the non-magnetic intermediate layer 8, and between the non-magnetic intermediate layer 8 and the second magnetic layer 10, respectively. The first intermediate interface layer 7 is made of an Ag—Zn alloy; it is preferred that the content of Ag in the Ag—Zn alloy is in the range of 45-85 at % as discussed later. In the specification, the content is shown as an atomic percentage unless it is specifically noted. It is also preferred that a layer thickness is in the range of 0.2-2.0 nm. The first intermediate interface layer 7 can be also made of an Au—Zn alloy. In that case, it is preferred that the content of Au is in the range of 45-85 at % and that a layer thickness is in the range of 0.2-2.0 nm. Meanwhile, the second intermediate interface layer 9 is made of Zn. The second intermediate interface layer 9 can be also made of Cu, and it further can be made of an Ag—Zn alloy or an Au—Zn alloy.

These intermediate interface layers 7 and 9 prevent atoms from the non-magnetic intermediate layer from diffusing into each of the magnetic layers 6 and 10 by a heat treatment as discussed later, and have an effect to avoid the characteristic degradation of each of the magnetic layers 6 and 10. The second magnetic layer 10 is formed above the non-magnetic intermediate layer 8 made of ZnO through the second intermediate interface layer 9. In a layer structure according to the present embodiment, the second magnetic layer is formed to match a crystal lattice of the non-magnetic intermediate layer 8 (ZnO). Therefore, atomic diffusion from the non-magnetic intermediate layer 8 to the second magnetic layer 10 is difficult to occur compared with diffusion to the first magnetic layer 6. As discussed above, since the second intermediate interface layer 9 is not required to have a higher diffusion prevention effect than the first intermediate interface layer 7, it is not necessary to be made of an Ag—Zn alloy or an Au—Zn alloy, and it is enough to be made of Zn or Cu.

A first magnetic linkage layer 5 is provided between the first magnetic layer 6 and a first exchange coupling magnetic field application layer 14 of the first shield layer 3, and functions to transfer an exchange magnetic field from the first exchange coupling magnetic field application layer 14 to the first magnetic layer 6 as discussed later. The first magnetic linkage layer 5 according to the present embodiment has a three-layer laminated structure, an Ru layer/a CoFe layer/an Ru layer. In the specification, the designations A/B/C . . . indicate that the layers, A, B, C, and . . . are laminated in this order.

Similarly, a second magnetic linkage layer 11 is provided between the second magnetic layer 10 and a second exchange coupling magnetic field application layer 15 of the second shield layer 4, and functions to transfer an exchange magnetic field from the second exchange coupling magnetic field application layer 15 to the second magnetic layer 10 as discussed later. The second magnetic linkage layer 11 according to the present embodiment has a single Ru layer structure.

The first shield layer 3 and the second shield layer 4 act as an electrode that applies a sense current in a layer surface orthogonal direction P of the MR laminated body 2. The first shield layer 3 is provided in the side that faces the first magnetic layer 6 through the first magnetic linkage layer 5. The first shield layer 3 includes the first exchange coupling magnetic field application layer 14, a first antiferromagnetic layer 13 that contacts the first exchange coupling magnetic field application layer 14 and that is provided in the rear side of the first exchange coupling magnetic field application layer 14 seen from the first magnetic layer 6, and a first main shield layer 12 that is provided in the rear side of the first antiferromagnetic layer 13 seen from the first magnetic layer 6. The first exchange coupling magnetic field application layer 14 has a two-layer structure that includes a CoFe layer 14a that contacts the first antiferromagnetic layer 13, and an NiFe layer 14b that contacts both the CoFe layer 14a and the first magnetic linkage layer 5. The first antiferromagnetic layer 13 is made of IrMn and is strongly antiferromagnetically coupled with the CoFe layer 14a that is adjacent to it. A first main shield layer 12 is made of an NiFe layer and blocks an external magnetic field generated from adjacent bits on the same track of a recording medium M. A structure of the first main shield layer 12 is the same as a well known shield layer and a layer thickness is 1 µm. A layer thickness of the first main shield layer 12 is thicker than that of the first exchange coupling magnetic field application layer 14 and the first antiferromagnetic layer 13. Since the first main shield layer 12 has generally a multiple magnetic domain structure, the permeability is high. Therefore, the first main shield layer 12 effectively functions as a shield.

A structure of the second shield layer 4 is the same as that of the first shield layer 3. Specifically, the second shield layer 4 is provided in the side that faces the second magnetic layer 10 through the second magnetic linkage layer 11. The second shield layer 4 includes the second exchange coupling magnetic field application layer 15, a second antiferromagnetic layer 16 that contacts the second exchange coupling magnetic field application layer 15 and that is provided in the rear side of the second exchange coupling magnetic field application layer 15 seen from the second magnetic layer 10, and a second main shield layer 17 that is provided in the rear side of the second antiferromagnetic layer 16 seen from the second magnetic layer 10. The second exchange coupling magnetic field application layer 15 has a two-layer structure that includes a CoFe layer 15b that contacts the second antiferromagnetic layer 16, and an NiFe layer 15a that contacts both the CoFe layer 15b and the second magnetic linkage layer 11. The second antiferromagnetic layer 16 is made of IrMn and is strongly antiferromagnetically coupled with the CoFe layer 15b that is adjacent to it. A second main shield layer 17 is made of an NiFe layer and blocks an external magnetic field generated from adjacent bits on the same track of a recording medium. A structure of the second main shield layer 17 is the same as the well known shield layer and a layer thickness is 1 µm. A layer thickness of the second main shield layer 17 is thicker than that of the second exchange coupling magnetic field application layer 15 and the second antiferromagnetic layer 16. Since the second main shield layer 17 has generally a multiple magnetic domain structure, the permeability is high. Therefore, the second main shield layer 17 effectively functions as a shield.

The first and second antiferromagnetic layers 13 and 16 of the first and second shield layers 3 and 4, respectively, contact the CoFe layers 14a and 15b of the first and second exchange coupling magnetic field application layers 14 and 15, respectively. This is because a large exchange coupling strength with the first and second antiferromagnetic layers 13 and 16 are to be secured. When the first and second antiferromagnetic layers 13 and 16 contact the NiFe layers 14b and 15a, an exchange coupling strength is small and it is hard to fix the magnetization direction of the first and second exchange coupling magnetic field application layers 14 and 15 strongly by the first and second antiferromagnetic layers 13 and 16. The NiFe layers 14b and 15a are provided to improve the soft magnetic characteristic of the shield layers so that the shield layers more effectively function.

Referring FIG. 2A, an insulating layer 21 made of $Al_2O_3$ is provided on both sides of the MR laminated body 2 in a track width direction T. Since the insulating layer 21 is provided, a sense current, which flows in the layer surface orthogonal direction P of the MR laminated body 2, is concentrated in the MR laminated body 2. A layer thickness of the insulating layer 21 is an appropriate one that has enough insulation for the sides of the MR laminated body 2; a conductive layer may be formed on its outside. However, in that case, the first shield layer 3 is insulated from the second shield layer 4.

As shown in FIG. 2B, a bias magnetic field application layer 22 is provided on an opposite side of an ABS S of the MR laminated body through an insulating layer 23 made of $Al_2O_3$. The bias magnetic field application layer 22 is a hard magnetic layer made of CoPt, CoCrPt, and so on, and applies a bias magnetic field to the MR laminated body 2 in an orthogonal direction Q to the ABS S. The insulating layer 23 prevents a sense current from flowing into the bias magnetic field application layer 22.

Referring FIG. 1, a writing part 30 is formed above the shield layer 4 through an interelement shield layer 41, which is formed by sputtering, or the like. The writing part 30 has a structure for so-called the perpendicular magnetic recording. A magnetic pole layer for writing includes a main magnetic pole layer 31 and an auxiliary magnetic pole layer 32. These magnetic pole layers 31 and 32 are formed by a frame plating method and so on. The main magnetic pole layer 31 is made of CoFe, and is exposed at the ABS S in an orthogonal manner. A coil layer 33 is wound around the main magnetic pole layer 31, and extends over a gap layer 34, which is made of an insulating material, so that the magnetic flux is induced to the main magnetic pole layer 31 by the coil layer 33. The coil layer 33 is formed by a frame plating method or the like. The magnetic flux is guided through the inside of the main magnetic pole layer 31 and is emitted toward the recording medium from the ABS S. The main magnetic pole layer 31 has a narrowed size around the ABS S, not only in the layer surface orthogonal direction P, but also in the track width direction T (the direction that is orthogonal to the paper surface in FIG. 1; refer to FIG. 2 as well). Therefore, it generates a minute and strong writing magnetic field that is suitable for high recording density.

The auxiliary magnetic pole layer 32 is a magnetic layer that is magnetically connected with the main magnetic pole layer 31. The auxiliary magnetic pole layer 32 is a magnetic pole layer with a layer thickness of about 0.01-0.5 μm and is an alloy, for example, that is made of either two or three of the following materials: Ni; Fe; and Co. The auxiliary magnetic pole layer 32 is branched from the main magnetic pole layer 31 and faces the main magnetic pole layer 31 through the gap layer 34 and a coil insulating layer 35 in the ABS S. The edge portion of the auxiliary magnetic pole layer 32 in the ABS S forms a trailing shield part of which the layer cross section (area) in the edge portion is larger than other portions of the auxiliary magnetic pole layer 32. Because of providing the auxiliary magnetic pole layer 32, the magnetic field gradient between the auxiliary magnetic pole layer 32 and the main magnetic pole layer 31 is precipitous in the area near the ABS S. As a result, signal output jitter is small, and the error rate of reading (or reproducing) is small.

The operation principle for reading magnetic information on a recording medium by the thin film magnetic head is briefly explained below.

First of all, the magnetization state for each layer under the magnetic field-free state in which no magnetic field has been applied is explained. In this state, the magnetization direction of each layer is a track width direction T, and examples are shown as arrows in Table 1. In Table 1, for example, a left-pointing arrow means that the magnetization direction of each layer in FIG. 2A is also in a left-pointing direction.

The first antiferromagnetic layer 13 and the second antiferromagnetic layer 16 are magnetized in advance under the following condition that the magnetization direction of the first exchange coupling magnetic field application layer 14, which is antiferromagnetically coupled with the first antiferromagnetic layer 13, and the magnetization direction of the second exchange coupling magnetic field application layer 15, which is antiferromagnetically coupled with the second antiferromagnetic layer 16, are the same directions (for example, in the left-pointing direction; see Table 1). The CoFe layer 5b of the first magnetic linkage layer 5 is exchange-coupled with the first exchange coupling magnetic field application layer 14 through the Ru layer 5a of the first magnetic linkage layer 5. When a layer thickness of the Ru layer 5a is the same as shown in Table 1, an exchange coupling strength of Ru is in a negative state; and the magnetization direction of the CoFe layer 5b of the first magnetic linkage layer 5 is opposite to the magnetization direction of the first exchange coupling magnetic field application layer 14 (for example, in the right-pointing direction; see Table 1). Similarly, the CoFe layer 5b is exchange-coupled with the first magnetic layer 6 through the Ru layer 5c; and the magnetization direction of the first magnetic layer 6 is opposite to the magnetization direction of the CoFe layer 5b due to the negative exchange coupling strength of Ru (for example, in the left-pointing direction; see Table 1). Since the magnetization directions of the second antiferromagnetic layer 16, the second exchange coupling magnetic field application layer 15, the second magnetic linkage layer 11, and the second magnetic layer 10 are considered in the same manner as described above, the magnetization direction of the second magnetic layer 10 is opposite to the magnetization direction of the second exchange coupling magnetic field application layer 15 (for example, in the right-pointing direction; see Table 1). Therefore, under the magnetic field-free state, the first magnetic layer and the second magnetic layer are magnetized in antiparallel directions to each other.

A bias magnetic field application layer 22, which is provided in a rear side of the two magnetic layers 6 and 10 and the non-magnetic intermediate layer 8 seen from the ABS, applies a bias magnetic field toward the ABS S in an orthogonal direction to the ABS S. The magnetization directions of the first magnetic layer 6 and the second magnetic layer 10 are rotated toward the ABS S, respectively, under the influence of the bias magnetic field. As a result, the magnetization directions of the first magnetic layer 6 and the second magnetic layer 10 are rotated in a direction from an antiparallel state to a parallel state, and then they form a certain relative angle.

Under this situation, when an external magnetic field, which is in an orthogonal direction to the ABS S, from a recording medium M is applied, the relative angle between the magnetization directions of the first magnetic layer 6 and the second magnetic layer 10 are changed according to a direction of the external magnetic field. As a result, the electric resistance of a sense current is changed. Therefore, an external magnetic field can be detected by using the change of the relative angle between the magnetization directions of the first magnetic layer 6 and the second magnetic layer 10.

The thin film magnetic head according to the present embodiment is manufactured by the method described below. First, the first shield layer 3 is formed above a substrate 91 (see FIG. 1), then each of layers configuring the MR laminated body 2 is formed on or above the first shield layer 3 by sputtering. Next, after each of the layers is patterned (by patterning), both sides of a track width direction T are filled with an insulating layer 21. After that, a portion other than the area corresponding between the ABS S and the height h of a device (see FIG. 1) is milled (by milling), and then the bias magnetic field application layer 22 is formed through an insulating layer 23. Thus, the insulating layer 21 is formed on both sides of the MR laminated body 2 in the track width direction T, and the bias magnetic field application layer 22 is formed at the rear side of the MR laminated body 2 seen from the ABS S. Subsequently, the second shield layer 4 is formed. Then, the writing part 30 described above is formed by a conventional method.

The thin film magnetic head that has a pair of magnetic layers magnetically controlled by a shield layer is explained above as an example. Needless to say, the feature of the present invention is applied to other layer configurations. For example, a brief description of the thin film magnetic head that has a layer configuration of a conventional spin valve type MR laminated body 2' is given below with reference to FIG. 3 and Table 2. The explanation regarding the non-magnetic intermediate layer 8, and the first and second intermediate interface layers 7 and 9 sandwiched by the two magnetic layers, as the feature of the present invention, is omitted.

Figure 3:
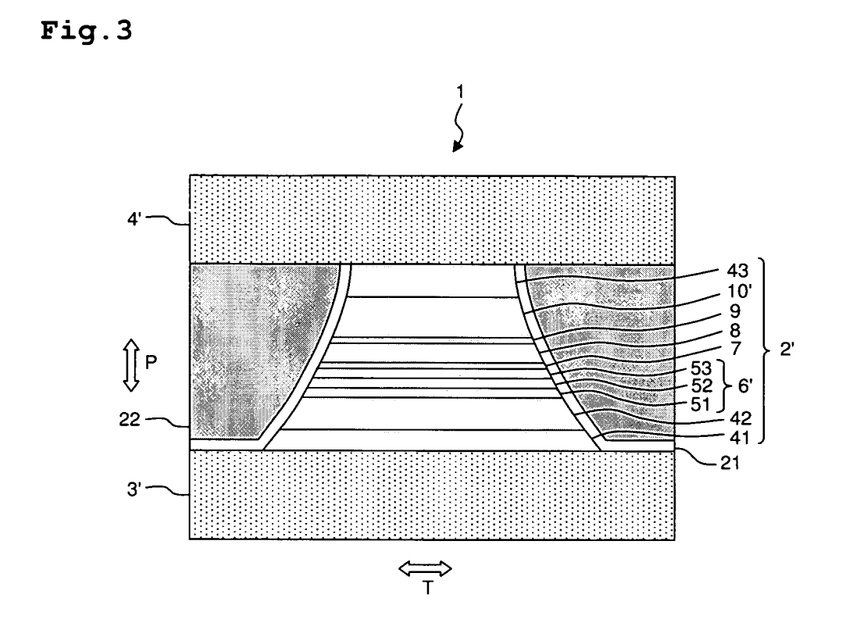
FIG. 3 is a side view of an alternate example of the reading part of the thin film magnetic head seen from the 2A-2A direction in FIG. 1.

FIG. 3 is a side view of the reading part of the thin film magnetic head seen from the ABS S. Table 2 shows a layer configuration of the MR laminated body 2'. The table shows the laminated layers from a first shield layer 3' to a second shield layer 4' from the bottom up.

TABLE 2

| Layer Configuration | | Layer Thickness (nm) |
|---|---|---|
| Cap Layer 43 | Ru Layer | 2 |
| Second Magnetic Layer (Free Layer) 10' | CoFe Layer | 3 |
| Second Intermediate Interface Layer 9 | Zn Layer | 0.4 |
| Non-Magnetic Intermediate Layer 8 | ZnO Layer | 1.8 |
| First Intermediate Interface Layer 7 | Ag—Zn Layer | 0.8 |
| First Magnetic Layer (Pinned Layer) 6' | Inner Pinned Layer 53 CoFe Layer | 3.5 |
| | Spacer Layer 52 Ru Layer | 0.8 |
| | Outer Pinned Layer 51 CoFe Layer | 3 |
| Antiferromagnetic Layer 42 | IrMn Layer | 5.5 |
| Buffer Layer 41 | Cr Layer | 2 |

The MR laminated body 2' is a laminated body in which each of layer is laminated in the following order from the bottom up: a first shield layer 3' made of an NiFe layer with a layer thickness of about 1 μm, a buffer layer 41, an antiferromagnetic layer 42, a first magnetic layer (pinned layer) 6', a first intermediate interface layer 7, a non-magnetic intermediate layer 8, a second intermediate interface layer 9, a second magnetic layer (free layer) 10', and a cap layer 43. The magnetization direction of the pinned layer 6' is fixed according to an external magnetic field. The magnetization direction of the free layer 10' is changed according to an external magnetic field. The first and second shield layers 3' and 4' act as an electrode that applies a sense current in a layer surface orthogonal direction of the MR laminated body 2'. The magnetization direction of the free layer 10' and the magnetization direction of the pinned layer 6' are in a relative angle relationship according to the external magnetic field. A spin-dependent scattering of conduction electrons is changed according to the relative angle, so that the change in the magnetoresistance occurs. The thin film magnetic head reads magnetic information written in a recording medium by detecting such a change in the magnetoresistance.

The pinned layer 6' is configured as a so-called synthetic pinned layer. In other words, the pinned layer 6' includes an outer pinned layer 51, an inner pinned layer 53 formed in the vicinity of the first intermediate interface layer 8 compared with the outer pinned layer 51, and a spacer layer 52 sandwiched by the outer pinned layer 51 and the inner pinned layer 53. The magnetization direction of the outer pinned layer 51 is fixed by an exchange coupling between the antiferromagnetic layer 42 and the outer pinned layer 51. The inner pinned layer 53 further antiferromagnetically couples with the outer pinned layer 51 through the spacer layer 52, so that the magnetization direction of the inner pinned layer 53 is strongly fixed. In the synthetic pinned layer, as described above, the pinned layer 6' keeps a stable magnetization state, and at the same time, an effective magnetization of the pinned layer 6' is controlled.

The buffer layer 41 is formed to obtain a good exchange coupling between the antiferromagnetic layer 42 and the outer pinned layer 51. The cap layer 43 is formed to prevent each of the laminated layers from degradation. The second shield layer 4' made of an NiFe layer with a layer thickness of about 1 μm was formed on the cap layer 43. A bias magnetic field application layer 22 that makes the free layer 10' a single magnetic domain is formed at the side of the MR laminated body 2' through an insulating layer 21 made of $Al_2O_3$. As discussed above, in the thin film magnetic head 1 shown in FIG. 3, the bias magnetic field application layer 22 that is a hard magnetic layer made of CoPt, CoCrPt, and so on applies a magnetic field to the MR laminated body 2' in a parallel direction T to the ABS S.

(Exemplary Embodiment)

The heat resistance of the thin film magnetic head according to the present embodiment were considered. Specifically, test samples were manufactured with respect to the thin film magnetic head that has a layer configuration shown in Table 1. Those test samples had varying contents of Ag in an Ag—Zn alloy of a first intermediate interface layer 7 and varying layer thicknesses of the first intermediate interface layer 7. Then, an MR ratio of the test samples was measured before and after a heat treatment. The manufacturing condition, such as a layer thickness of each of layers, was as follows.

A first main shield layer 12 with a layer thickness of 1 μm was formed on an ALTiC ($Al_2O_3$—TiC) substrate, and then a first antiferromagnetic layer 13 made of an IrMn alloy with a layer thickness of 6 nm was formed thereon by a DC magnetron sputtering apparatus. Then, a CoFe alloy with a layer thickness of 1.5 nm and an NiFe alloy with a layer thickness of 10 nm were formed in this order to provide a first exchange coupling magnetic field application layer 14. A laminated layer configured of three layers (a Ru layer with a layer thickness of 0.8 nm, a CoFe alloy layer with a layer thickness of 1 nm, and a Ru layer with a layer thickness of 0.8 nm) was formed on the first exchange coupling magnetic field application layer 14 to provide a first magnetic linkage layer 5. A first magnetic layer 6 with a layer thickness of 4.5 nm was formed on the first magnetic linkage layer 5, and then a first intermediate interface layer 7 made of an Ag—Zn alloy was formed with varying layer thicknesses and contents of Ag as parameters. A non-magnetic intermediate layer 8 made of ZnO with a layer thickness of 1.6 nm, a second intermediate interface layer 9 made of Zn with a layer thickness of 0.4 nm, and a second magnetic layer 10 with a layer thickness of 3 nm were formed on the first intermediate interface layer 7. Then, a second magnetic linkage layer 11 with a layer thickness of 0.8 nm was formed, and a reading head configuration was formed after milling. Subsequently, an NiFe alloy with a layer thickness of 10 nm and a CoFe alloy of a layer thickness of 1.5 nm were formed in this order to provide a second exchange coupling magnetic field application layer 15. An IrMn alloy with a layer thickness of 6 nm was formed thereon to provide a second antiferromagnetic layer 16. An NiFe alloy with a layer thickness of 1 μm was formed thereon to provide a second main shield layer 17, and then an annealing process was conducted for three hours at a temperature of 250° C. An MR ratio before and after this annealing process was measured. In the present embodiment, the first intermediate interface layer 7 was formed by sputtering in which Ag or Au, and Zn were sputtered at the same time. However, it is possible that after Ag or Au, and Zn are alternatively formed and laminated with each other, an alloy layer may be formed by a heat treatment for 1-10 hours at a temperature of 200-350° C.

Figure 4:
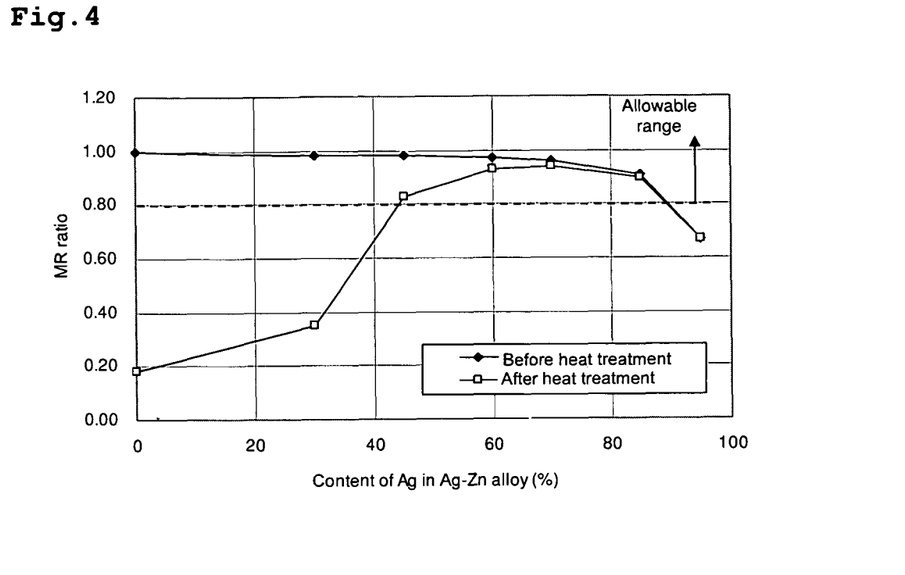
FIG. 4 is a graph showing a magnetoresistance ratio before and after a heat treatment versus the content (at %) of Ag in an Ag—Zn alloy of a first intermediate interface layer.

FIG. 4 is a graph showing the relationship between the content (at %) of Ag in an Ag—Zn alloy of a first intermediate interface layer and an MR ratio before and after a heat treatment.

FIG. 4 shows the measurement results of an MR ratio before and after a heat treatment of test samples in which the first intermediate interface layer 7 that had varying contents of Ag in an Ag—Zn alloy. A layer thickness of the first intermediate interface layer 7 in each test sample was fixed as 0.8 nm. An MR ratio of each test sample showed a normalization value when an MR ratio of a test sample with no Ag before a heat treatment (comparison case 1) was 1.0.

The MR ratio of a test sample as the comparison case 1 in which the first intermediate interface layer was only made of Zn was largely decreased by a heat treatment. It is understood that this is because Zn and O in the non-magnetic intermediate layer and Zn in the intermediate interface layer are diffused into the first magnetic layer 6 by the heat of the heat treatment. When the content of Ag is increased, the decrease of the MR ratio is largely reduced. Therefore, since an alloy of Ag and Zn is formed in the first intermediate interface layer 7, the diffusion of an atom into the first magnetic layer by heat of a heat treatment is controlled, and then the decrease of spin polarizability of the first magnetic layer 6 is controlled. An MR ratio is decreased when Ag as a non-magnetic metal exists between two magnetic layers 6 and 10. Due to this phenomenon, an MR ratio before the heat treatment is dramatically decreased at the area close to the point where the content of Ag is 100%. After the discussion described above is considered, an allowable range of an MR ratio after a heat treatment is determined to be as 0.8 or greater. Therefore, it is preferred that the content of Ag in an Ag—Zn alloy of the first intermediate interface layer 7 is 45-85%.

When the content of Ag is in this range, an Ag—Zn alloy phase is formed, not a solid solution phase, as is also apparent from a generally-known Ag—Zn binary phase diagram. In the Ag—Zn alloy phase, it is difficult for atoms to move because each atom forms a lattice compared with a solid solution phase. Therefore, it is effective to prevent atoms from diffusing into the magnetic layer 6. Ag contained in the first intermediate interface layer 7 has the property of a non-solid solution with the first magnetic layer 6 made of CoFe, and Ag becomes an alloy with Zn in the first intermediate interface layer 7. Therefore, the first intermediate interface layer 7 does not give an adverse effect to the first magnetic layer 6 such as decreasing the polarizability. As a result, even though a heat treatment is conducted, a good MR ratio is realized because of spin conductions through the non-magnetic intermediate layer 8 made of ZnO.

Figure 5:
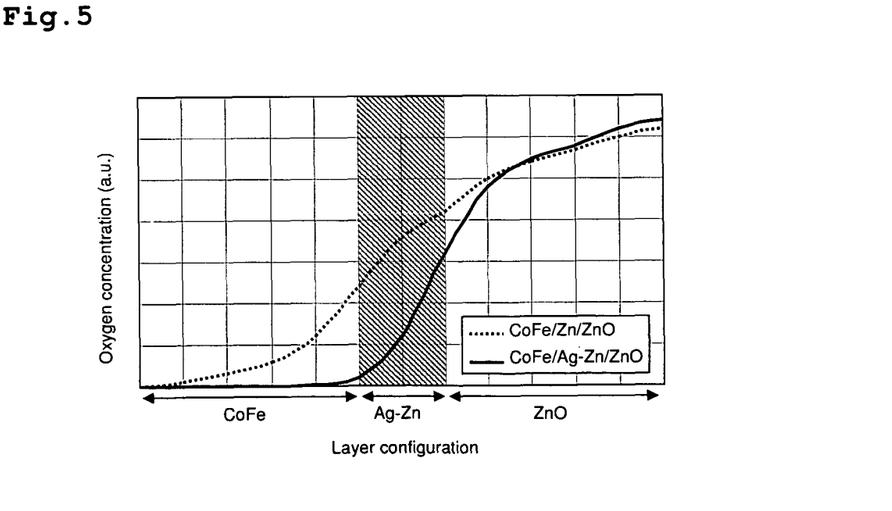
FIG. 5 is a graph showing the change of oxygen concentration in a laminated direction of a first magnetic layer, a first intermediate interface layer, and a non-magnetic intermediate layer.

With respect to the diffusion prevention effect of atoms due to formation of the Ag—Zn alloy phase in the first intermediate interface layer 7, as an example, an explanation of the diffusion of oxygen from the non-magnetic intermediate layer 8 is given with reference to FIG. 5.

FIG. 5 shows a result of composition analysis for a test sample by a secondary ion mass spectrometry (SIMS), and is a graph showing the change of oxygen concentration in a laminated direction in the thin film magnetic head according to the present embodiment. The test sample was formed under the following conditions: the content of Ag in an Ag—Zn alloy of the first intermediate interface layer 7 was 46%; a layer thickness of it was 0.4 nm; and an annealing process with the same condition described above was conducted. For comparison purposes, a result of analysis for the first intermediate interference layer 7 made of only Zn is shown together. When the first intermediate interference layer 7 was made of only Zn (a dotted line in the drawing), an oxygen concentration was gradually changed from the non-magnetic intermediate layer 8 to the first magnetic layer 6. Since a finite oxygen concentration was observed at the interface between the first intermediate interface layer 7 and the first magnetic layer 6, it indicates that oxygen was diffused into the first magnetic layer 6 from the non-magnetic intermediate layer 8. Meanwhile, when the first intermediate interface layer 7 was made of an Ag—Zn alloy (a solid line in the drawing), an oxygen concentration was suddenly decreased in the first intermediate interface layer 7 and was almost zero in the first magnetic layer 6. As discussed above, it is understood that the first intermediate interface layer 7 made of an Ag—Zn alloy has a great effect to prevent oxygen from diffusing into the magnetic layer 6 from the non-magnetic intermediate layer 8.

Figure 6:
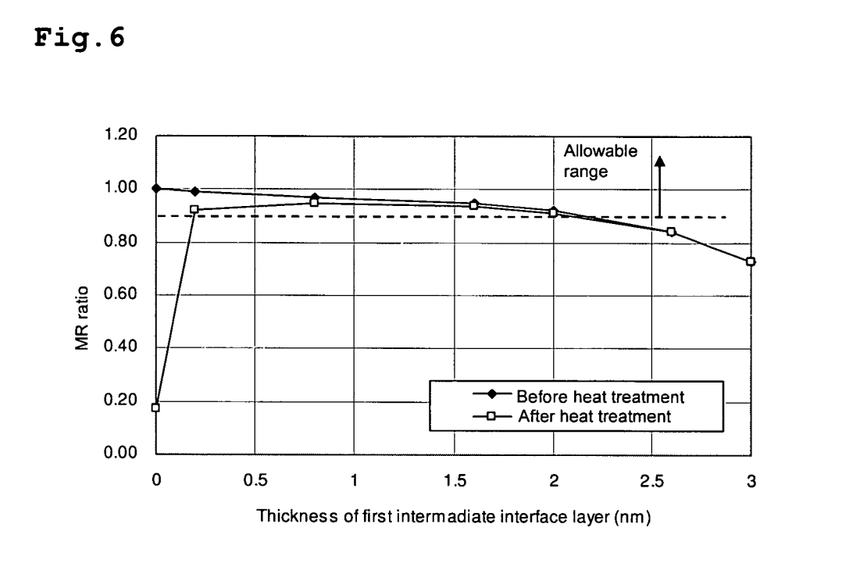
FIG. 6 is a graph showing a magnetoresistance ratio before and after a heat treatment versus a thickness of a first intermediate interface layer.

Next, FIG. 6 shows a measurement result of an MR ratio before and after a heat treatment of test samples that had varying layer thicknesses of the first intermediate interface layer 7. The content of Ag in an Ag—Zn alloy in each test sample was 50%, that is, a value to form an Ag—Zn alloy phase. An MR ratio of each test sample showed a normalization value when an MR ratio of a test sample with a layer thickness of zero of the first intermediate interface layer 7 before a heat treatment (comparison case 2) was 1.0.

The MR ratio of a test sample of the comparison case 2 in which the first magnetic layer 6 directly contacted the non-magnetic intermediate layer 8 was largely decreased by a heat treatment. When the first intermediate interface layer 7 made of an Ag—Zn alloy slightly existed, the decrease of the MR ratio was largely reduced. This effect did not largely depend on a layer thickness. When a layer thickness was increased, the resistance itself was increased, and then the MR ratio was gradually decreased. After the discussion described above is considered, an allowable range of an MR ratio after a heat treatment is determined as 0.9 or greater. Therefore, it is preferred that the layer thickness of the first intermediate interface layer 7 is 0.2-2 nm.

As discussed above, the thin film magnetic head according to the present embodiment has the first and second intermediate interface layers 7 and 9 at the interface between the first magnetic layer 6 and the non-magnetic intermediate layer 8, and at the interface between the non-magnetic intermediate layer 8 and the second magnetic layer 10, respectively. Since the first intermediate interface layer 7 is made of Ag and Zn and contacts the first magnetic layer 6 provided on the lower side of a laminated direction, the diffusion of atoms by a heat treatment, such as an annealing process, from the non-magnetic intermediate layer 8 to the first magnetic layer 6 is controlled. The first intermediate interface layer 7 itself does not give an adverse effect to the first magnetic layer 6. Therefore, a characteristic degradation of the first magnetic layer 6 is reduced. As a result, in a layer configuration that includes a non-magnetic metal layer at the interface between a non-magnetic intermediate layer made of ZnO and a magnetic layer, a large MR ratio can be maintained even after a heat treatment.

Figure 7:
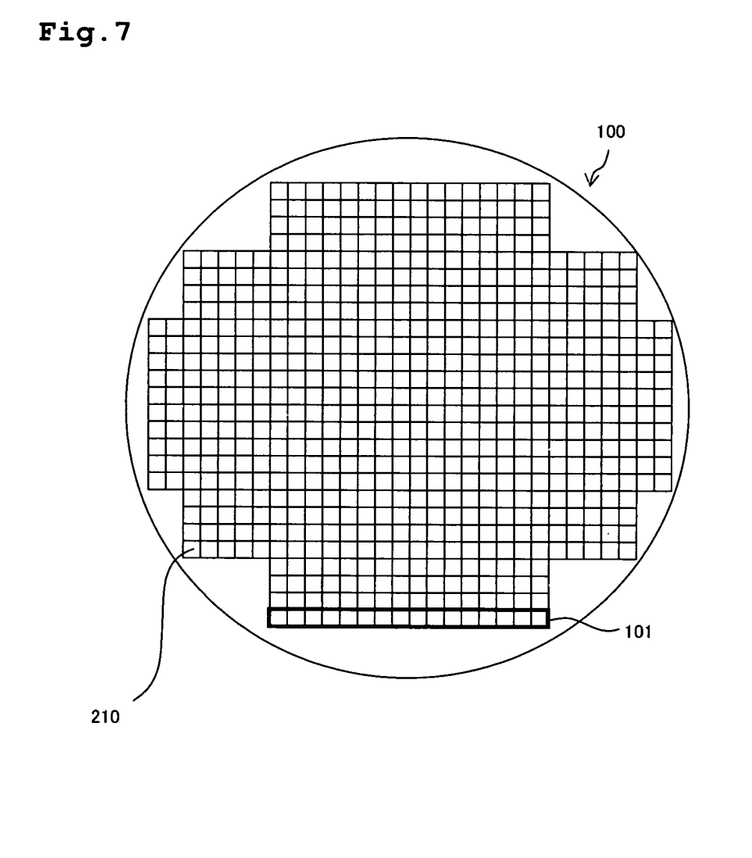
FIG. 7 is a top plan view of a wafer that is related to the production of the thin film magnetic head according to the present invention.

Next, a wafer used for manufacturing the aforementioned thin film magnetic head is described below. As shown in FIG.

7, on a wafer 100 is formed at least a laminated body configuring the aforementioned thin film magnetic head. The wafer 101 is divided into a plurality of bars 101, which are work units for polishing the ABS S. After polishing, the bar 101 is cut into sliders 210 each containing a thin film magnetic head. The wafer 100 is provided with cutting margins (not shown) used for cutting the wafer 100 into bars 101 and the bars 101 into sliders 210.

Figure 8:
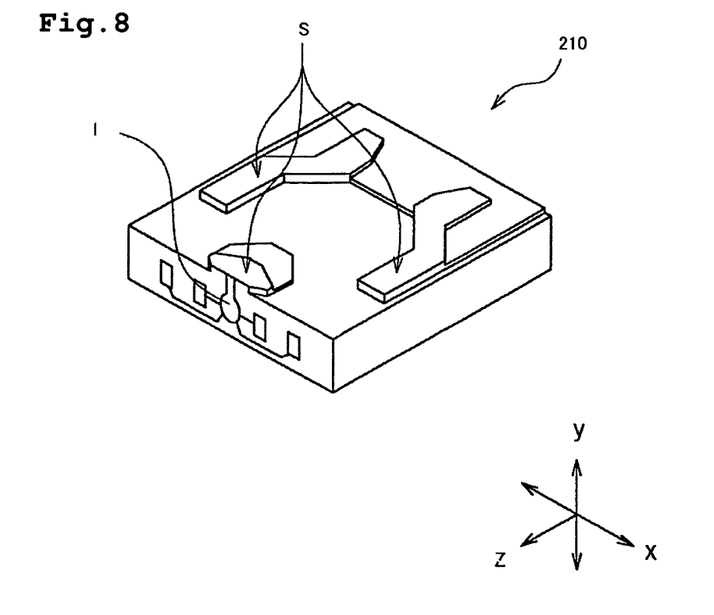
FIG. 8 is a perspective view of a slider according to the present invention.

As shown in FIG. 8, the slider 210 is substantially hexahedron-shaped. One face thereof is the ABS S that faces a hard disk.

Figure 9:
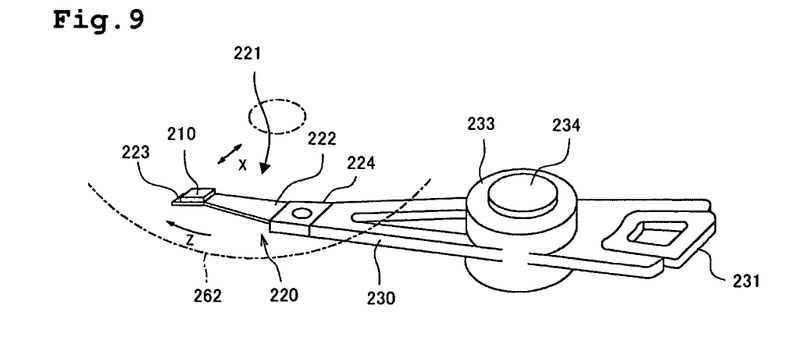
FIG. 9 is a perspective view of a head arm assembly that includes a head gimbal assembly assembled with a slider according to the present invention.

As shown in FIG. 9, a head gimbal assembly 220 includes a slider 210 and a suspension 221 for elastically supporting the slider 210. The suspension 221 includes a spring-set load beam 222 made of stainless steel, a flexure 223 provided on one edge of the load beam 222 and a base plate 224 provided on the other edge of the load beams 222. The flexure 223 is provided with the slider 210, giving a proper degree of freedom. On the section in which the slider 210 is mounted on the flexure 223 is provided a gimbal part for keeping the position of the slider 210 constant.

The slider 210 is placed inside a hard disk device, facing a hard disk, which is a disk-shaped recording medium to be rotated. At a time when a hard disk is rotated in the z-direction in FIG. 9, airflow passing through the space between the hard disk and the slider 210 provides lift force for the slider 210 downward in the y-direction. The slider 210 is moved away from the surface of the hard disk by the lift force. The thin film magnetic head 1 is formed in the vicinity of the edge portion on the air exit side (i.e., the edge portion on the lower left side in FIG. 8) of the slider 210.

The portion in which the head gimbal assembly 220 is mounted on an arm 230 is referred to as a head arm assembly 221. The arm 230 allows moving the slider 210 in the x-direction crossing the track of the hard disk 262. One edge of the arm 230 is mounted on the base plate 224. On the other edge of the arm 230, a coil 231 is mounted, which constitutes part of the voice coil motor. A bearing part 233 is provided in the middle section of the arm 230. The arm 230 is rotatably supported by a shaft 234 mounted on the bearing part 233. The arm 230 and the voice coil motor for driving the arm 230 constitute an actuator.

Figure 10:
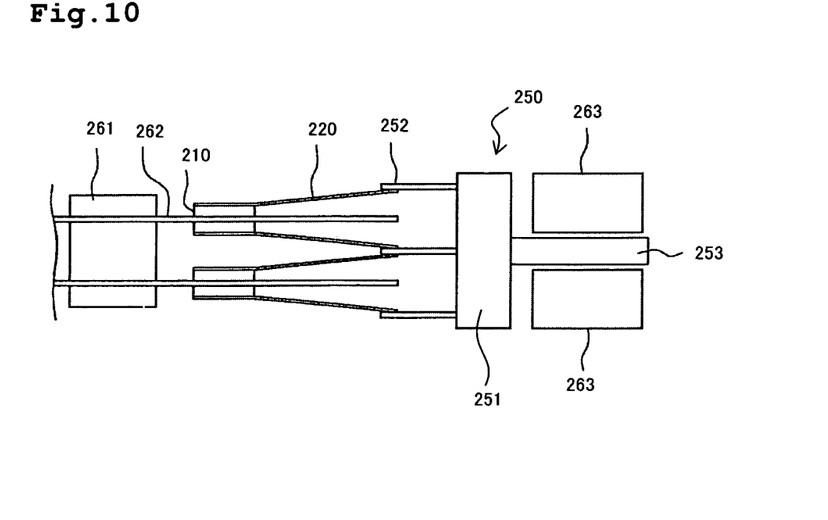
FIG. 10 is a side view of a head arm assembly assembled with a slider according to the present invention.
Figure 11:
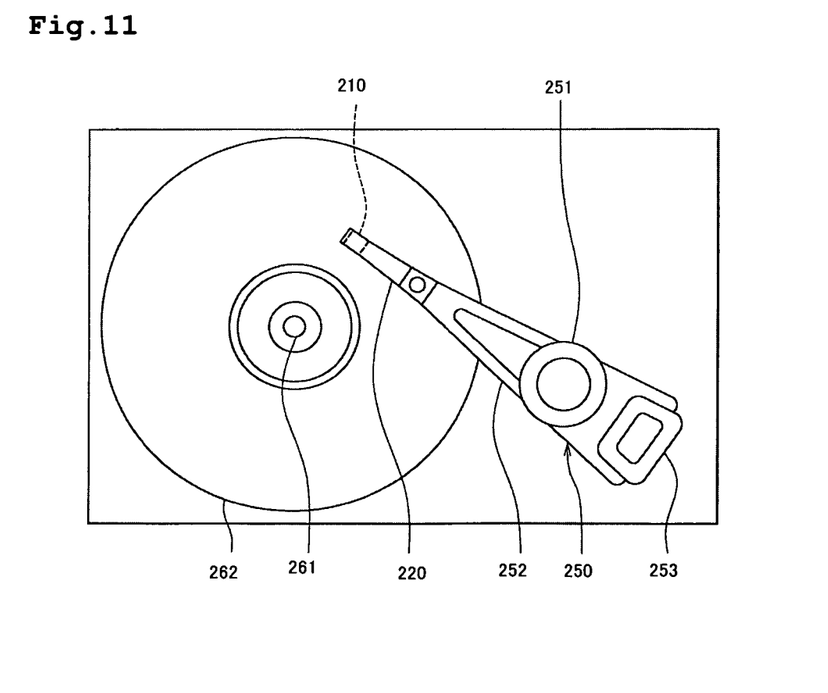
FIG. 11 is a top plan view of a hard disk device according to the present invention.

Next, descriptions of a head stack assembly into which the aforementioned slider is integrated and of a hard disk device are given below with reference to FIG. 10 and FIG. 11. The head stack assembly includes a carriage having a plurality of arms, wherein a head gimbal assembly 220 is mounted on each arm. FIG. 10 is a side view of the head stack assembly. FIG. 11 is a top plan view of a hard disk device. The head stack assembly 250 includes a carriage 251 having a plurality of arms 252. On each arm 252, head gimbal assemblies 220 are mounted at an interval in the vertical direction. On the side of the carriage 251 opposite to the arm 252, the coil 253 is mounted, which constitutes part of a voice coil motor. The voice coil motor has permanent magnets 263 disposed facing each other on both sides of the coil 253.

As shown in FIG. 11, the head stack assembly 250 is integrated into the hard disk device. The hard disk device has multiple hard disks 262 mounted on a spindle motor 261. For each hard disk 262, two sliders 210 are disposed facing each other on both sides of the hard disk 262. The head stack assembly 250 (excluding the slider 210) and an actuator, which correspond to the positioning device according to the present invention, not only supports the slider 210 but also positions the slider 210 with respect to the hard disk 262. The slider 210 is moved in the direction crossing the track of the hard disk 262 by means of the actuator to be positioned with respect to the hard disk 262. The thin film magnetic head 1 of the slider 210 records information on the hard disk 262 by means of a writing head and reproduces information recorded on the hard disk 262 by means of a reading head.

A description of the preferred embodiment according to the present invention was given above in detail. However, it should be appreciated that a wide variety of alterations and modifications are possible as far as they do not depart from the spirit and scope of the attached claims.

What is claimed is:

1. A thin film magnetic head comprising:
   first and second magnetic layers in which a magnetization direction of at least one of the first and second magnetic layers changes according to an external magnetic field, the first magnetic layer being provided at a lower side of a laminated direction, and the second magnetic layer being provided at an upper side of the laminated direction;
   a non-magnetic intermediate layer made of ZnO that is sandwiched between the first and second magnetic layers;
   a first intermediate interface layer provided at an interface between the first magnetic layer and the non-magnetic intermediate layer; and
   a second intermediate interface layer provide at an interface between the non-magnetic intermediate layer and the second magnetic layer, wherein
   the first and second magnetic layers, the non-magnetic intermediate layer, and the first and second intermediate interface layers configure a magnetoresistive effect (MR) laminated body,
   at least the first intermediate interface layer consists of Ag and Zn, or Au and Zn, and
   the second intermediate interface layer is made of Zn or Cu.

2. The thin film magnetic head according to claim 1, wherein
   the first intermediate interface layer is made of an Ag—Zn alloy.

3. The thin film magnetic head according to claim 2, wherein
   the content of Ag in the Ag—Zn alloy is in a range of 45-85 at %.

4. The thin film magnetic head according to claim 2, wherein
   a layer thickness of the first intermediate interface layer is in a range of 0.2-2.0 nm.

5. The thin film magnetic head according to claim 2, wherein
   the first intermediate interface layer is configured to prevent oxygen from diffusing from the non-magnetic intermediate layer into the first magnetic layer.

6. The thin film magnetic head according to claim 1, wherein
   the first intermediate interface layer is made of an Au—Zn alloy.

7. The thin film magnetic head according to claim 1, further comprising:
   a bias magnetic layer that is provided at a side opposite to an air bearing surface (ABS) of the MR laminated body, and that applies a bias magnetic field to the MR laminated body in an orthogonal direction to the ABS;
   first and second shield layers as electrodes that apply an sense current in a layer surface orthogonal direction of the MR laminated body, sandwiching the MR laminated body in the layer surface orthogonal direction of the MR laminated body, the first shield layer being provided at the lower side of the laminated direction, and the second shield layer being provided at the upper side of the laminated direction, wherein the magnetization directions of the first and second magnetic layers change according to the external magnetic field, the first shield layer comprises: a first exchange coupling magnetic field application layer that applies a first exchange coupling magnetic field to the first magnetic layer in a parallel direction to the ABS; and a first antiferromagnetic layer that is provided at a rear side of the first exchange coupling magnetic field application layer seen from the first magnetic layer, that contacts the first exchange coupling magnetic field application layer, and that is antiferromagnetically coupled with the first exchange coupling magnetic field application layer, the second shield layer comprises: a second exchange coupling magnetic field application layer that applies a second exchange coupling magnetic field to the second magnetic layer in a parallel direction to the ABS and in an antiparallel direction to the first exchange coupling magnetic field which the first exchange coupling magnetic field application layer applies to the first magnetic layer; and a second antiferromagnetic layer that is provided at a rear side of the second exchange coupling magnetic field application layer seen from the second magnetic layer, that contacts the second exchange coupling magnetic field application layer, and that is antiferromagnetically coupled with the second exchange coupling magnetic field application layer.

8. The thin film magnetic head according to claim 1, further comprising:

a bias magnetic layer that is provided at a side of the MR laminated body and that applies a bias magnetic field to the MR laminated body, and one of the magnetization directions of the first and second magnetic layers is fixed regardless of the external magnetic field.

9. A slider equipped with the thin film magnetic head according to claim 1.

10. A head gimbal assembly comprising the slider according to claim 9 and a suspension that elastically supports the slider.

11. A hard disk device comprising the slider according claim 9 and a device that support the slider and positions the slider with respect to a recording medium.

12. A wafer on which a laminated body is formed, the laminated body being configured as the thin film magnetic head according to claim 1.

13. The thin film magnetic head according to claim 1, wherein the first intermediate interface layer comprises an atom diffusion prevention layer that prevents atoms from diffusing from the non-magnetic intermediate layer into the first magnetic layer.

14. A thin film magnetic head comprising:

first and second magnetic layers in which a magnetization direction of the first and second magnetic layers changes according to an external magnetic field;

a non-magnetic intermediate layer made of ZnO;

a first atom diffusion prevention layer provided at an interface between the first magnetic layer and the non-magnetic intermediate layer, the first atom diffusion prevention layer consisting of Ag and Zn, or Au and Zn and being configured to prevent diffusion of atoms from the non-magnetic intermediate layer into the magnetic layer; and a second atom diffusion prevention layer provided at an interface between the second magnetic layer and the non-magnetic intermediate layer, the second atom diffusion prevention layer being made of Zn or Cu and being configured to prevent diffusion of atoms from the non-magnetic intermediate layer into the second magnetic layer.

* * * * *